United States Patent
Stafstrom

(10) Patent No.: US 12,247,958 B2
(45) Date of Patent: Mar. 11, 2025

(54) METHOD FOR DETERMINING AN OPERATING FLOW RATE FOR A CHROMATOGRAPHIC COLUMN IN AN HPLC SYSTEM

(71) Applicant: Cytiva Sweden AB, Uppsala (SE)

(72) Inventor: Nils Stafstrom, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 414 days.

(21) Appl. No.: 17/772,902

(22) PCT Filed: Nov. 17, 2020

(86) PCT No.: PCT/EP2020/082365
§ 371 (c)(1),
(2) Date: Apr. 28, 2022

(87) PCT Pub. No.: WO2021/099301
PCT Pub. Date: May 27, 2021

(65) Prior Publication Data
US 2022/0404321 A1  Dec. 22, 2022

(30) Foreign Application Priority Data
Nov. 20, 2019 (GB) .................................... 1916889

(51) Int. Cl.
*G01N 30/32* (2006.01)
*G01N 30/86* (2006.01)
*G01N 30/02* (2006.01)

(52) U.S. Cl.
CPC ......... *G01N 30/32* (2013.01); *G01N 30/8658* (2013.01); *G01N 2030/027* (2013.01); *G01N 2030/324* (2013.01)

(58) Field of Classification Search
CPC ............... G01N 30/32; G01N 30/8658; G01N 2030/027; G01N 2030/324

(Continued)

(56) References Cited

U.S. PATENT DOCUMENTS

2015/0246297 A1* 9/2015 Bjernulf ................. G01N 30/32
210/90

FOREIGN PATENT DOCUMENTS

EP        2888584 A1    7/2015
JP     2014145675 A    8/2014
(Continued)

OTHER PUBLICATIONS

PCT International Search Report and Written Opinion for PCT/EP2020/082365 mailed Jan. 28, 2021 (15 pages).
(Continued)

*Primary Examiner* — Nathaniel T Woodward
(74) *Attorney, Agent, or Firm* — Eversheds-Sutherland (US) LLP

(57) ABSTRACT

Disclosed is a method for determining an operating flow rate for a chromatographic column (4) in an HPLC system (1). The method comprises: measuring/calculating a pressure of the system (1) without the chromatographic column (4) for one or more flow rates; fitting a function to the flow rate(s) and corresponding pressure(s), calculating from the function and a predetermined recommended flow rate for the chromatographic column (4) a system pressure drop at the predetermined recommended flow rate. An operating flow rate is determined by summing the system pressure drop and a maximal column pressure limit, and determining a contribution of the system pressure drop to the summed pressure. If this contribution exceeds 1% an operating flow rate for the column is determined to a flow rate that corresponds to a pressure at a pressure monitor arranged before the column that is lower than the predetermined maximum column pressure limit.

12 Claims, 3 Drawing Sheets

(58) Field of Classification Search
USPC .......................................................... 73/61.56
See application file for complete search history.

(56) References Cited

FOREIGN PATENT DOCUMENTS

| JP | 2015526731 | A  | 9/2015  |
|----|------------|----|---------|
| WO | 2005114227 | A1 | 12/2005 |
| WO | 2009062538 | A1 | 5/2009  |
| WO | 2014031070 | A1 | 2/2014  |

OTHER PUBLICATIONS

GB Search Report for Application No. 1916889.7 mailed May 20, 2020 (5 pages).
Gomis-Fons Joaquin et al: "Integration of a complete downstream process for the automated lab-scale production of a recombinant protein", Journal of Biotechnology, vol. 301, May 27, 2019 (May 27, 2019), pp. 45-51.
First Japanese Office Action for corresponding to JP Patent Application No. 2022-529368, mailed Apr. 22, 2024 (6 pages).

* cited by examiner

METHOD FOR DETERMINING AN OPERATING FLOW RATE FOR A CHROMATOGRAPHIC COLUMN IN AN HPLC SYSTEM

CROSS REFERENCE TO RELATED APPLICATIONS

This application claims the priority benefit of PCT/EP2020/082365, filed Nov. 17, 2020, which claims the priority benefit to GB Application No. 1916889.7, filed Nov. 20, 2019, the entire contents of which are incorporated herein by reference.

TECHNICAL FIELD

The present document relates to a method for determining an operating flow rate for a chromatographic column in a high performance liquid chromatographic system, to a high performance liquid chromatographic system comprising a system controller for determining such an operating flow rate, and to a computer program and a computer program product for performing the method.

BACKGROUND ART

High performance liquid chromatographic (HPLC) systems, like the ÄKTA™ systems from Cytiva™ Life Sciences, are used to separate, identify and quantify compounds, such as bio-molecules, from a sample consisting of a mixture of compounds. The sample is dissolved in a fluid mobile phase, which carries the mixture through an immobile, immiscible stationary phase, which usually is a column packed with (functionalized) particles, typically 1-10 micrometers in diameter. The phases are chosen based on the affinity of the compound of interest towards the phases. The compounds of the mixture travel at different speeds through the column causing them to separate. The retention time, the rate of movement of the compound through the medium, varies depending on the interaction strength with the stationary phase, the composition of solvent used and the flow rate of the mobile phase. Compounds separated by the column may be detected by means of mass spectrometry, UV/VIS light absorption, fluorescence, light scattering or refractive index.

Separation power of an HPLC system increases with a smaller stationary phase particle size, as the surface area of the phase increases. Smaller particle size, however, increases the resistance to flow making the use of high pressures desirable.

For each column there is a specific maximum flow pressure which the column can withstand without breaking. This pressure is dependent on the material of the stationary phase and on the material of the column itself. For each column there is also a predetermined recommended fluid flow rate at which the separation power of the column is optimized.

All components in an HPLC system, i.e. flow cells, valves, pumps, column etc., are connected to each other with different tubings. The sample of interest is diluted in the tubings, which causes a negative effect on the resolution of the system. The resolution will decrease with increasing diameter of the tubing. Narrow tubings increase the resolution, while a drawback with more narrow tubings is an increased backpressure in the system.

Backpressure is a resistance or force opposing the desired flow rate of fluid through the system, leading to friction loss and pressure drop and thereby a decreased fluid flow rate through the column. To compensate for the pressure drop, such that the fluid flow rate through the column is kept at the recommended predetermined flow rate, the pressure applied by the pumps may be increased. Thereby, there is a risk that the increased pressure approaches or exceeds the maximum pressure capability of the HPLC system and the specific column used.

The HPLC system may comprise a system pump pressure monitor, which measures pressure after the system pump(s), a pressure monitor after the sample pump, which measures the sample pressure, and pressure monitors at the inlet and outlet ports of the column valve to measure pre-column pressure and post-column pressure. The delta column pressure is the difference between the pre-column pressure and the post-column pressure. Pressure alarms can be set for the system pressure after the system pump and/or for the delta-column pressure to warn the user that a maximum pressure of the system or column has been reached or that the pressure has exceeded a preset limit. When a preset limit has been exceeded, the system may be automatically stopped.

EP288584 shows a chromatographic system comprising only one pressure monitor arranged immediately after the pump. A controller is arranged to estimate the pre-column pressure based on the registered system pressure, the characteristics of the flow path, and the viscosity and flow-rate of the liquid in the system.

For unexperienced HPLC users it may be difficult to know how to set an operating flow rate to safely run the chromatographic system without the risk of causing immediate pressure alarms and stops of the system due to the use of a too high flow rate.

SUMMARY OF THE INVENTION

It is an object of the present disclosure to provide a method for determining an operating flow rate for a chromatographic column in a high performance liquid chromatographic system, such that the chromatographic system may be safely run without the risk of causing immediate pressure alarms and stops of the system due to the use of a too high flow rate. Other objects are to provide a high performance liquid chromatographic system comprising a system controller for determining such an operating flow rate, and a computer program and a computer program product for performing the method.

The invention is defined by the appended independent patent claims. Non-limiting embodiments emerge from the dependent patent claims, the appended drawings and the following description.

According to a first aspect there is provided a method for determining an operating flow rate for a chromatographic column in a high performance liquid chromatographic system. The system comprises a liquid reservoir for a liquid medium, a chromatographic column in fluid communication with the liquid reservoir, wherein the chromatographic column has a predetermined recommended flow rate and a predetermined maximal column pressure limit, a system pump arrangeable to force liquid from the liquid reservoir through the chromatographic column at a certain flow rate, a fluid flow path connecting the liquid reservoir, the system pump and the chromatographic column, and a pressure monitor arranged before the chromatographic column. The method comprises: a) measuring or calculating a pressure of the system without the chromatographic column for one or more flow rates, b) fitting a function to the flow rate(s) and corresponding measured or calculated pressure(s), c) calculating from the function and the predetermined recommended flow rate for the chromatographic column a system pressure drop at the predetermined recommended flow rate, and d) determining an operating flow rate for the chromatographic column by summing the system pressure drop and the predetermined maximal column pressure limit, and determining a contribution of the system pressure drop to the summed pressure, wherein if this contribution exceeds 1% an operating flow rate for the chromatographic column is determined to a flow rate that is lower than the predetermined maximum column pressure limit.

The high performance liquid chromatographic (HPLC) system may be an ÄKTA™ system from Cytiva™ Life Sciences. The column may be any column known in the art suitable for an HPLC system.

Having measured or calculated a pressure of the system without the chromatographic column for one or more flow rates, a function is fitted to the flow rate(s) and corresponding measured or calculated pressure(s). Measuring or calculating only one pressure, i.e. at the predetermined recommended flow rate for the column, may be enough if the flow rate is linear and a flow rate of 0 ml/min corresponds to a pressure of 0 MPa. Otherwise to or more flow rates may be necessary.

Using the function and the predetermined recommended flow rate for the chromatographic column a system pressure drop at the predetermined recommended flow rate is calculated.

Backpressure is a resistance or force opposing the desired flow rate of fluid through the system, leading to friction loss and pressure drop and thereby a decreased fluid flow rate through the column. To compensate for the pressure drop, such that the fluid flow rate through the column is kept at the recommended predetermined flow rate, the pressure applied by the pumps may be increased. Thereby, there is a risk that the increased pressure approaches or exceeds the maximum pressure capability of the HPLC system and the specific column used.

An operating flow rate for the chromatographic column in the specific system is determined, which compensates for the system pressure drop. Determining the operating flow rate may include a calculation, which may be an iterative process or an approximation. Determining an operating flow rate for the chromatographic column includes: summing the system pressure drop and the predetermined maximal column pressure limit, and determining a contribution of the system pressure drop to the summed pressure, wherein if this contribution exceeds 1%, an operating flow rate for the column is determined to a flow rate that corresponds to a pressure at the pressure monitor that is lower than the predetermined maximum column pressure limit. The pressure at the pressure monitor of the system (with column) being the combined column pressure and the pressure of the system.

In some embodiments, if the contribution of the system pressure drop to the summed pressure exceeds 1%, an operating flow rate for the column is determined to a flow rate that corresponds to a pressure at the pressure monitor of the system (with chromatographic column) that is 1-20%, 1-15% or 1-10% lower than the predetermined maximum column pressure limit. The operating flow rate for the column is determined to a flow rate that is sufficiently reduced to avoid an instant overpressure alarm in the system. The operating flow rate for the column should further be sufficiently high for the measurements to be performed satisfactorily.

If the calculated/measured pressure drop is lower than 1% or zero, the operating flow rate is kept at the same flow rate as the predetermined recommended flow rate for the column.

The above described method may be an automatic or at least a semi-automatic method. Most features and data may be automatically inserted into the system. Thereby, also unexperienced users may easily perform the method.

Through the above method the HPLC user, and also unexperienced HPLC users, will be able to set an operating flow rate to safely run the chromatographic system without the risk of causing immediate pressure alarms caused by the pressure added by the system due to the use of a too high flow rate for the system and column.

The pressure of the system may be measured by means of the pressure monitor for one or more flow rates, wherein the chromatographic column is replaced or bypassed with tubings.

The system may be provided with valves, which may be arranged to automatically bypass the column, thereby the bypassing of the column can be made an automatic process. The flow rates used preferably includes one or more flow rates at a low flow rate such as 100 μl/min and one or more flow rates at a high flow rate, such as 10 ml/min. The used flow rates depending on which column is to be used in the system.

The pressure of the system may in step b) of the method be calculated for one or more flow rates by subtracting pressure(s) of the system measured by means of the pressure monitor, wherein the chromatographic column is disconnected from the system, from pressure(s) of the system measured by means of the pressure monitor, wherein the chromatographic column is replaced or bypassed with tubings.

The system may be provided with valves, which may be arranged to automatically bypass the column, thereby the bypassing of the column can be made an automatic process. That the column is disconnected from the system is here meant that there is no replacement/bypassing of the column with tubings, but a gap is provided in the system such that the measured pressure is the pressure of the system before the column. This way of calculating the pressure may be used if the pressure of the system before the column is high, i.e. 10% higher or more than the total system pressure without column (column bypassed with tubings). The flow rates used preferably includes one or more flow rates at a low flow rate such as 100 μl/min and one or more flow rates at a high flow rate, such as 10 ml/min. The used flow rates depending on which column is to be used in the system.

Alternatively, the pressure of the system may in step a) of the method described above be calculated for one or more flow rates without the chromatographic column using the Bernoulli equation:

$$\Delta P = (128 * L * Q * \eta)/(\pi * d^4)$$

wherein, d is an inner diameter of the fluid flow path (mm), Q is the flow rate (ml/min), L is a length (mm) of the flow path and η is the viscosity (cP) of the liquid medium.

In this alternative, a pressure of the system is not measured in the system by the pressure monitor but is calculated for one or more flow rates for a system without the chromatographic column. The fluid flow path is the tubings in the system used to connect the liquid reservoir, the system pump and the chromatographic column, and also other parts of the system such as flow cells, valves etc. For performing this calculation some data about the chromatographic system and liquid used is, hence, needed. The flow rates used preferably includes one or more flow rates at a low flow rate such as 100 µl/min and one or more flow rates at a high flow rate, such as 10 ml/min. The used flow rates depending on which column is to be used in the system.

The pressure of the system may be measured or calculated without the chromatographic column for at least two different flow rates, preferably at least three different flow rates.

A higher number of flow rates may improve the method. The number of different flow rates may be four, five, six or more.

If the determined contribution of the system pressure drop to the summed pressure exceeds 5%, 10%, 15% or 20%, an operating flow rate for the chromatographic column is determined to a flow rate that corresponds to a pressure at the system pump which is lower than the predetermined maximum column pressure limit.

Which level to choose as a lower limit for the contribution of the system pressure drop to the summed pressure, i.e. 1%, 5%, 10%, 15% or 20%, may be determined through a theoretical calculation assuming that the pressure from only the column will be very close to the maximum pressure at the predetermined recommended flow rate without any effect of the pressure within the system. Defining a lower limit for the contribution of the system pressure drop to the summed pressure, small unnecessary reductions for columns that would not cause any alarms when run at the predetermined flow rate may be avoided. The limit should be set with a safety margin to avoid stops.

The method may further comprise calculating/measuring a delta-pressure for the chromatographic column in the system by measuring a pressure by means of the pressure monitor at the predetermined recommended flow rate and subtracting therefrom a measured or calculated pressure of the system without the chromatographic column at the predetermined recommended flow rate.

Using this method the delta-pressure can be calculated even though the system is provided with only one pressure monitor arranged before the column. Traditionally, the delta-pressure is calculated by means of a first pressure monitor arranged before the column and a second pressure column arranged after the column. The difference in pressure is then the delta-pressure. Adding a pressure monitor in the system after the column may affect the resolution of the chromatography system negatively.

This delta pressure may be used to protect the column such that the stationary phase, the packed bed, of the column is not damaged. A pressure alarm may be set at a predetermined maximum bed pressure, which normally is the pressure used for packing the bed (or a bit lower than this pressure) plus the calculated/measured pressure without the column.

According to a second aspect there is provided a high performance liquid chromatographic system comprising: a) a liquid reservoir for a liquid medium, a chromatographic column in fluid communication with the liquid reservoir, said chromatographic column having a predetermined recommended flow rate and a predetermined maximal column pressure limit, at least one system pump arrangeable to force liquid from the liquid reservoir through the chromatographic column at a certain flow rate, a fluid flow path connecting the liquid reservoir, the system pump and the chromatographic column, and a pressure monitor arranged before the chromatographic column, and b) a system controller for determining an operating flow rate for the chromatographic column of the system, wherein the system controller is arranged to perform steps a) to d) described above.

According to a third aspect there is provided a computer program comprising program code means for performing the method described above when the program is run on a computer.

According to a fourth aspect there is provided a computer program product comprising program code means stored on a computer readable medium for performing the method described above when the program is run on a computer.

DETAILED DESCRIPTION

Figure 1:
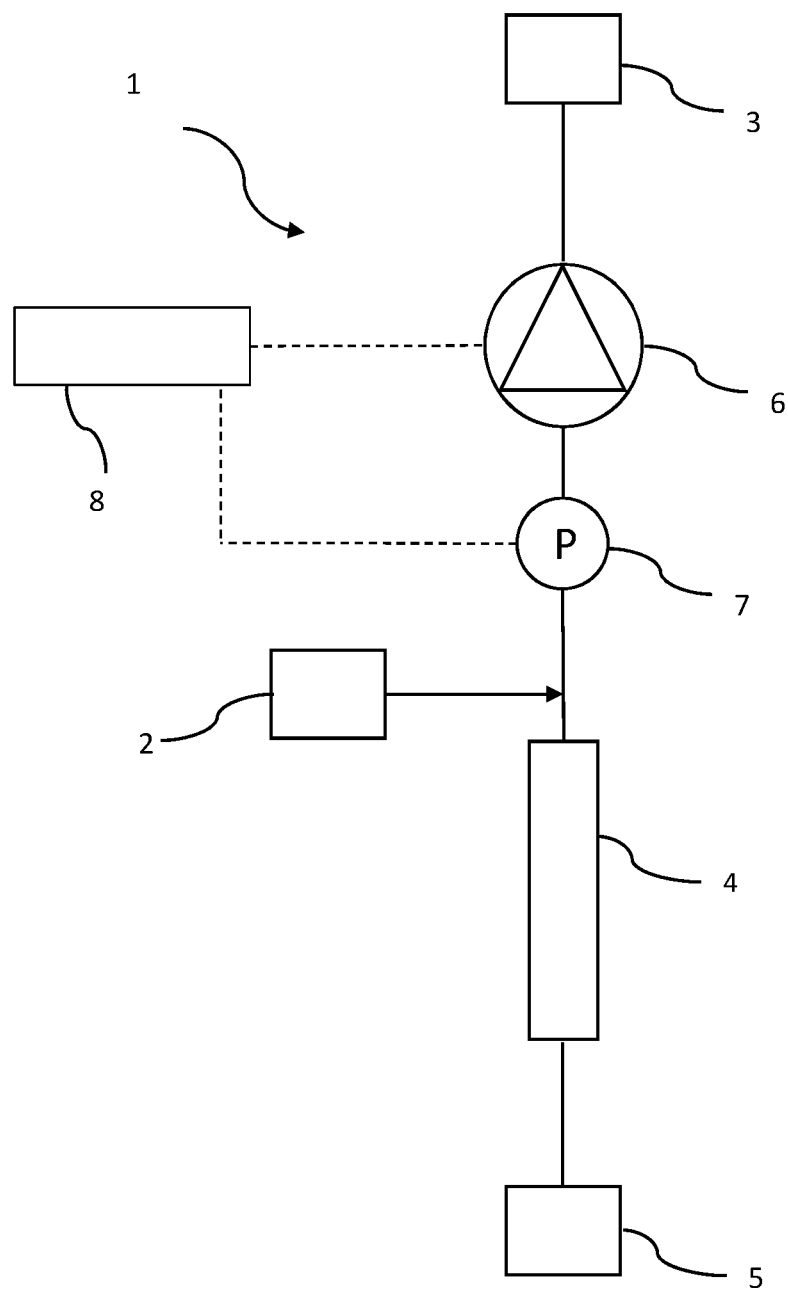
FIG. 1 schematically illustrates a high performance liquid chromatographic system.

In FIG. 1 is shown a high performance liquid chromatographic (HPLC) system 1. The HPLC system 1 may be used to separate, identify and quantify compounds, such as biomolecules, from a sample consisting of a mixture of compounds. The sample 2 may be dissolved in/injected into a fluid mobile phase, a liquid medium 3, which carries the mixture through the chromatographic column 4. The chromatographic column may e.g. be a size exclusion column, an affinity column, a hydrophobic interaction column, an ion exchange column or a reversed phase column. The column may have an immobile, immiscible stationary phase, which usually comprises packed (functionalized) particles, often 1-10 µm in diameter.

The compounds of the sample 2 travel at different speeds through the column 4 causing them to separate. The retention time, the rate of movement of the compound through the medium, varies depending on the interaction strength with the stationary phase, the composition of liquid medium used and the flow rate of the mobile phase.

Separation power of an HPLC system 1 increases with a smaller stationary phase particle size, as the surface area of the phase increases. Smaller particle size, however, increases the resistance to flow making the use of high pressures desirable.

For each chromatographic column 4 there is a predetermined recommended flow rate at which the separation power of the column is optimized, which is dependent on the material of the stationary phase and on the material of the column itself. For each column there is also a maximal column pressure limit, which is the highest pressure the column can withstand without breaking. This pressure is dependent on the material of the stationary phase and on the material of the column itself.

The compounds separated by the column 4 may be detected by a detector 5 using e.g. mass spectrometry, UV/VIS light absorption, fluorescence, light scattering or refractive index.

The HPLC system 1 further comprises at least one system pump 6 arranged to force liquid from the liquid reservoir 3 through the chromatographic column 4 at a certain flow rate.

A pressure monitor 7 measures the pressure after the system pump 6 before the chromatographic column. The exact location of the pressure monitor 7 may vary with different HPLC systems 1. In some set-ups, more than one pressure monitor may be arranged between the system pump 6 and the column 4.

A fluid flow path connects the liquid reservoir 3, the system pump 6 and the chromatographic column 4, and other components in the HPLC system, i.e. flow cells, valves, etc. (not shown). The flow path may be comprised of different tubings.

The sample is diluted in the tubings, which causes a negative effect on the resolution of the system. The resolution will decrease with increasing diameter of the tubings. Narrow tubings increase the resolution, while a drawback with more narrow tubings is an increased backpressure in the system.

Backpressure is a resistance or force opposing the desired flow rate of fluid through the system 1, leading to friction loss and pressure drop and thereby a decreased fluid flow rate through the column 4. To compensate for the pressure drop, such that the fluid flow rate through the column 4 is kept at the recommended predetermined flow rate, the pressure applied by the system pump 6 may be increased. Thereby, there is a risk that the increased pressure approaches or exceeds the maximum pressure capability of the HPLC system and the specific column used.

For inexperienced HPLC users it may be difficult to know how to set an operating flow rate to safely run the chromatographic system 1 without the risk of causing immediate pressure alarms and stops of the system due to the use of a too high flow rate.

Figure 2:
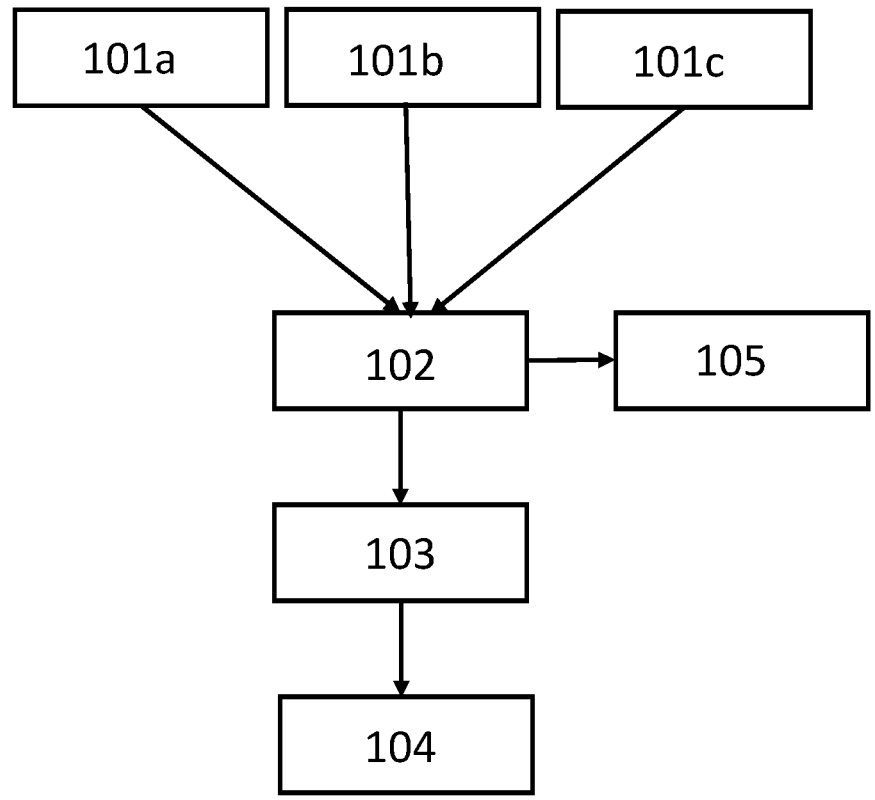
FIG. 2 shows a method for determining an operating flow rate for a chromatographic column in a high performance liquid chromatographic system.

In FIG. 2 is shown a method 100 for determining an operating flow rate for a chromatographic column 4 in the high performance liquid chromatographic system 1 of FIG. 1.

The method comprises the step of: a) measuring 101a or calculating 101b, 101c a pressure of the system without the chromatographic column for one or more flow rates.

Figure 3:
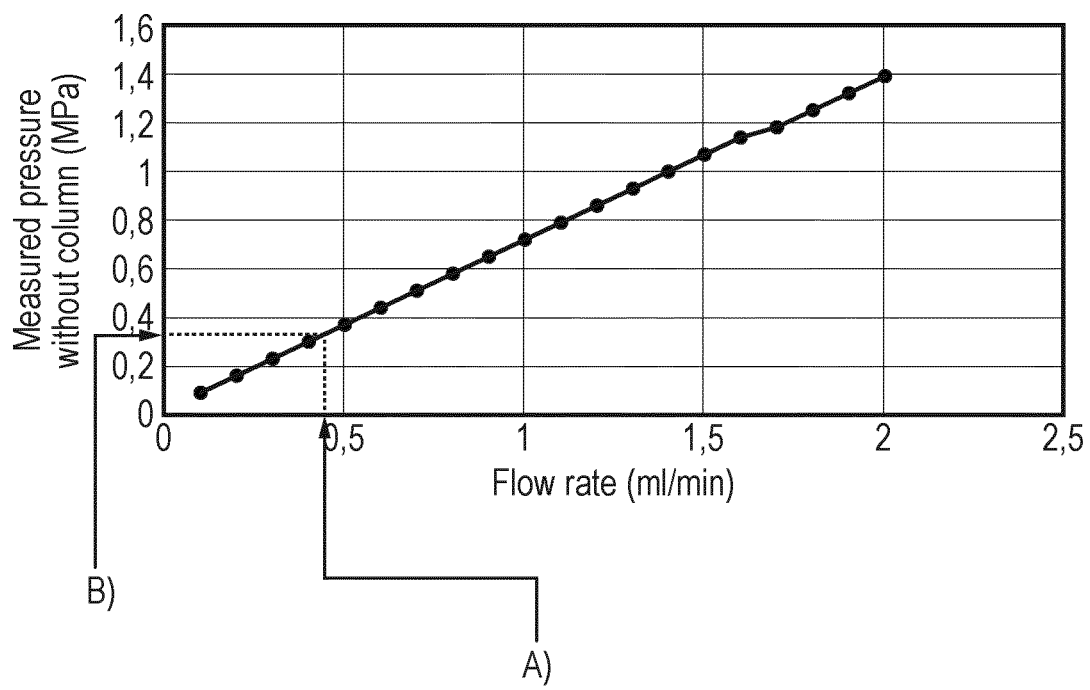
FIG. 3 shows a graph with measured pressures at different flow rates in a modified ÄKTA™ system without a chromatographic column, the column being bypassed using tubings.

The pressure of the system may be measured 101a for one or more flow rates without the chromatographic column by means of the pressure monitor 7. If more than one pressure monitor is arranged between the system pump 6 and the column 4, the pressure measured with the pressure monitor 7 arranged closest to the column 4 is the pressure measured 101a in the method. In FIG. 3 is shown an example of a graph with measured pressures at different flow rates without a chromatographic column.

Without the chromatographic column 4 is here meant that the column is replaced/bypassed with a fluid flow path, tubings. The system 1 may be provided with valves (not shown) which may be arranged to automatically bypass the column 4, thereby the bypassing of the column 4 can be made an automatic process.

If the pressure of the system before the column 4 is high the pressure of the system may be calculated for one or more flow rates by subtracting pressure(s) of the system measured by means of the pressure monitor 7, wherein the chromatographic column is disconnected from the system, from pressure(s) of the system measured by means of the pressure monitor 7, wherein the chromatographic column 4 is replaced or bypassed with tubings.

That the column 4 is disconnected from the system is here meant that there is no replacement/bypassing of the column with tubings, but a gap is provided in the system such that the measured pressure is the pressure of the system before the column 4.

Alternatively, the pressure of the system may be calculated 101c for one or more flow rates without the chromatographic column 4 using the Bernoulli equation:

$$\Delta P = (128 * L * Q * \eta)/(\pi * d^4)$$

wherein, d is an inner diameter of the fluid flow path (mm), Q is the flow rate (ml/min), L is a length (mm) of the flow path and $\eta$ is the viscosity (cP) of the liquid medium.

In this alternative, a pressure of the system 1 is not measured in the system by the pressure monitor 7 but is calculated for one or more flow rates for a system without the chromatographic column 4. The fluid flow path is the tubings in the system used to connect the liquid reservoir, the system pump and the chromatographic column, and also other parts of the system such as flow cells, valves etc. For performing this calculation some data about the chromatographic system 1 and liquid used is, hence, needed.

In case the viscosity is not known, it may be assumed that water is used, whereby the viscosity can be estimated for different temperatures using a known expression like:

$$V \text{ [cP]} = A \times 10^{B/(T-C)} \text{ where } T = \text{temperature [K]};$$
$$A = 0.02414; B = 247.8 \text{ K}; C = 140 \text{ K}.$$

In the next step b) of the method a function is fitted 102 to the flow rate(s) and corresponding measured or calculated pressure(s).

Thereafter, in step c) of the method a system pressure drop at the predetermined recommended flow rate may be calculated from the function and the predetermined recommended flow rate for the column. The system pressure drop can be calculated from the graph in FIG. 3 as the pressure, indicated as B) in the graph, at the predetermined recommended flow rate, indicated as A) in the graph.

In step d) of the method, an operating flow rate for the chromatographic column 4 in the specific system 1 is determined 104, which compensates for the system pressure drop. Determining the operating flow rate may include a calculation, which may be an iterative process or an approximation. Determining 104 an operating flow rate for the chromatographic column 4 includes: summing the system pressure drop and the predetermined maximal pressure limit of the column, and determining a contribution of the system pressure drop to the summed pressure. If this contribution exceeds 1%, an operating flow rate for the column 4 is determined to a flow rate that corresponds to a pressure at the pressure monitor that is lower than the predetermined maximum column pressure limit.

In FIG. 1, a system controller 8 is arranged for determining the operating flow rate for the chromatographic column 4 of the high performance liquid chromatographic system 1, wherein the system controller 8 is arranged to perform steps a) to d) discussed above.

Through the above method the HPLC user, and also unexperienced HPLC users, will be able to set an operating flow rate to safely run the chromatographic system 1 without the risk of causing immediate pressure alarms caused by the pressure added by the system due to the use of a too high flow rate for the system and column.

The method may further comprise calculating/measuring 105 a delta-pressure for the column 4 in the system 1 by measuring a pressure by means of the pressure monitor 7 at the predetermined recommended flow rate and subtracting therefrom a measured or calculated pressure of the system without the chromatographic column 4 at the predetermined recommended flow rate using the function from step 102 of the method.

Using this method the delta-pressure can be calculated even though the system is provided with only pressure monitor 7 arranged before the column 4. Traditionally, the delta-pressure is calculated by means of a first pressure monitor arranged before the column and a second pressure column arranged after the column. The difference in pressure is then the delta-pressure. Adding a pressure monitor in the system 1 after the column 4 may affect the resolution of the chromatography system negatively.

This delta pressure may be used to protect the column such that the stationary phase, the packed bed, of the column is not damaged. A pressure alarm may be set at a predetermined max bed pressure, which normally is the pressure used for packing the bed (or a bit lower than this pressure) plus the calculated/measured pressure without the column 4.

If the delta pressure is the limiting factor one can instead of lowering the flow rate, increase the delta pressure limit alarm with the same amount of pressure that is measured or calculated without the column. This given that it is only components after the column that are included in the calculation/measurement. Alternatively, the flow rate for the complete system without the column may be measured and then the components after the column may be removed and thereby the pressure generated by these post-column components obtained. This increase can only be made as long as the column hardware pressure limit is not exceeded.

In Table 1 below follows examples of calculations made using the method described above for determining an operating flow rate for a range of different columns 4 used in a modified ÄKTA™ pure system from Cytiva™ Life Sciences. The ÄKTA™ pure system being modified by exchanging all tubings to tubings having a smaller inner diameter of 0.2 mm, thereby creating an HPLC system with an increased backpressure as compared to an ÄKTA™ pure system with original tubings.

The system pressure was measured 101a or calculated 101b for a column 4 at various flow rates using water as the liquid medium. In the graph in FIG. 3. measured 101a system pressures for different flow rates (without column) are shown. A function was fitted 102 to the flow rates and corresponding measured/calculated pressures, FIG. 3. When other liquid mediums than water are used, one can repeat the test using the particular liquid.

In one example, the predetermined recommended flow rate for the column 4, a 200 increase 5/150 column from Cytiva™ Life Sciences, is 0.45 ml/min and the column 4 has a maximum column pressure limit of 2 MPa. The pressure drop, indicated as B) in FIG. 3, at the predetermined flow rate, indicated as A) in FIG. 3, was 0.32 MPa. The sum of the pressure drop and the maximal column pressure limit was 2.32 MPa. The contribution of the pressure drop to the summed pressure was 16% and hence exceeded 1%. The operating flow rate for the column was determined to a flow rate that corresponds to a pressure at the pressure monitor, i.e. the combined column pressure and pressure of the system, that was 5% lower than the predetermined maximum column pressure limit, i.e. 1.9 MPa, and the determined operating flow rate for the column was 0.370 ml/min, which corresponds to a flow rate that is about 18% lower than the predetermined recommended flow rate. The determined operating flow rate may be rounded to a flow rate that has no more than two valid digits.

In another example from Table 1, the pressure of the system was calculated 101b as discussed above. The predetermined recommended flow rate for the column, a S 75 5/150 column from Cytiva™ Life Sciences, is 0.3 ml/min and the column has a maximum column pressure limit of 1.8 MPa. The pressure of the system was calculated 101b for different flow rates by subtracting pressure(s) of the system 1 measured by means of the pressure monitor 7, wherein the chromatographic column was disconnected from the system (no tubings used), from pressure(s) of the system measured by means of the pressure monitor, wherein the chromatographic column was replaced or bypassed with tubings. A function was fitted to the calculated pressures and corresponding flow rates (not shown, but is similar to the graph in FIG. 3). The pressure drop at the predetermined flow rate is the difference between the pressure at the pressure monitor 7 when arranged to force liquid through the system 1 without column (the column was bypassed with tubings), here 0.39 MPa, and the pressure of the system with disconnected column at the predetermined recommended flow rate, here 0.18 MPa, and was 0.21 MPa. The sum of the pressure drop and the maximal column pressure limit was 2.01 MPa. The contribution of the pressure drop to the summed pressure was 12% and hence exceeded 1%. The operating flow rate for the column was determined to a flow rate that corresponds to a pressure at the pressure monitor, i.e. the combined column pressure and pressure of the system that was 3% lower than the predetermined maximum column pressure limit, i.e. 1.74 MPa, and the determined operating flow rate for the column was 0.26 ml/min, which corresponds to a flow rate that is about 12% lower than the predetermined recommended flow rate.

TABLE 1

| Column type | Predetermined recommended flow rate (ml/min) | Maximum column pressure limit (MPa) | Summed pressure = maximum column pressure limit + system pressure drop (MPa) | Contribution to summed pressure | Determined operating flow rate (ml/min) | Decrease of flow rate | New pressure at pressure monitor (MPa) |
|---|---|---|---|---|---|---|---|
| 200 increase 3.2/300 | 0.075 | 1.5 | 1.55 | 3% | 0.075 | 0% | 1.55 |
| 200 increase 5/150 | 0.45 | 2 | 2.32 | 16% | 0.370 | 18% | 1.90 |
| 200 increase 10/300 GL | 0.75 | 2.6 | 3.13 | 20% | 0.600 | 20% | 2.50 |
| 200 3.2/300 | 0.05 | 1.5 | 1.54 | 2% | 0.050 | 0% | 1.54 |
| 200 5/150 | 0.3 | 1.5 | 1.71 | 14% | 0.250 | 17% | 1.43 |
| 200 10/300 GL | 0.5 | 1.5 | 1.85 | 23% | 0.380 | 24% | 1.41 |
| 30 increase 3.2/300 | 0.075 | 1.5 | 1.55 | 3% | 0.075 | 0% | 1.55 |
| 30 increase 10/300 | 0.8 | 2.6 | 3.16 | 22% | 0.630 | 21% | 2.49 |
| S 75 3.2/300 | 0.05 | 2.4 | 2.44 | 1% | 0.050 | 0% | 2.44 |

TABLE 1-continued

| Column type | Predetermined recommended flow rate (ml/min) | Maximum column pressure limit (MPa) | Summed pressure = maximum column pressure limit + system pressure drop (MPa) | Contribution to summed pressure | Determined operating flow rate (ml/min) | Decrease of flow rate | New pressure at pressure monitor (MPa) |
|---|---|---|---|---|---|---|---|
| S 75 5/150 | 0.3 | 1.8 | 2.01 | 12% | 0.260 | 13% | 1.74 |
| S 75 10/300 GL | 0.8 | 1.8 | 2.36 | 31% | 0.570 | 29% | 1.68 |
| S 75 increase 3.2/300 | 0.075 | 2 | 2.05 | 3% | 0.075 | 0% | 2.05 |
| S 75 increase 5/150 | 0.45 | 3 | 3.32 | 11% | 0.400 | 11% | 2.95 |
| S 75 increase 10/30 | 0.8 | 3 | 3.56 | 19% | 0.650 | 19% | 2.89 |
| S 6 increase 3.2/300 | 0.04 | 1.5 | 1.53 | 2% | 0.040 | 0% | 1.53 |
| S 6 increase 5/150 GL | 0.3 | 3 | 3.21 | 7% | 0.300 | 0% | 3.21 |
| S 6 increase 10/300 GL | 0.5 | 2.6 | 2.95 | 13% | 0.430 | 14% | 2.54 |
| S 6 3.2/300 | 0.04 | 1.2 | 1.23 | 2% | 0.040 | 0% | 1.23 |
| S 6 10/300 GL | 0.5 | 1.5 | 1.85 | 23% | 0.380 | 24% | 1.41 |
| Source 4.6/100 PE | 4 | 4 | 6.80 | 70% | 2.200 | 45% | 3.74 |
| Resource 1 ml | 4 | 1.5 | 4.30 | 187% | 1.300 | 68% | 1.40 |
| Mono Q 4.6/100 | 4 | 2 | 4.80 | 140% | 1.600 | 60% | 1.90 |

For the calculations shown in Table 1, the contribution limit was set to 10%. The contribution limit may be set as low as 1%. Alternatively, it can be set at a higher limit such as 15% or 20%. Here, a pressure contribution below 10% was not considered a problem and a determined operating flow rate was kept at the same flow rate as the predetermined recommended flow rate for the column. Which level to choose as a lower limit for the contribution of the system pressure drop to the summed pressure may be determined through a theoretical calculation assuming that the pressure from just the column will be very close to the maximum pressure at the predetermined recommended flow rate without any effect of the pressure within the system. Defining a lower limit for the contribution of the system pressure drop to the summed pressure, small unnecessary reductions for columns that would not cause any alarms when run at the predetermined flow rate may be avoided. The limit should preferably be set with a safety margin to avoid stops of the system due to the use of a too high flow rate.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept accordingly is not to be limited. Reference to an element in the singular is not intended to mean "one and only one" unless explicitly so stated, but rather "one or more". All structural and functional equivalents to the elements of the above-described embodiments that are known to those of ordinary skill in the art are expressly incorporated herein and are intended to be encompassed hereby.

The invention claimed is:

1. A method for determining an operating flow rate for a chromatographic column in a high-performance liquid chromatographic system, the system comprising:
    a liquid reservoir for a liquid medium,
    a chromatographic column in fluid communication with the liquid reservoir, said chromatographic column having a predetermined recommended flow rate and a predetermined maximal column pressure limit,
    a system pump arrangeable to force liquid from the liquid reservoir through the chromatographic column at a certain flow rate,
    a fluid flow path connecting the liquid reservoir, the system pump and the chromatographic column, and
    a pressure monitor arranged before said chromatographic column,
the method comprising:
    a) measuring or calculating a pressure of the system without the chromatographic column for one or more flow rates,
    b) fitting a function to said flow rate(s) and corresponding measured or calculated pressure(s),
    c) calculating from said function and said predetermined recommended flow rate for the chromatographic column a system pressure drop at said predetermined recommended flow rate, and
    d) determining an operating flow rate for the chromatographic column by summing the system pressure drop and the predetermined maximal column pressure limit, and determining a contribution of the system pressure drop to the summed pressure, wherein if this contribution exceeds 1% an operating flow rate for the chromatographic column is determined to a flow rate that corresponds to a pressure at the pressure monitor that is lower than the predetermined maximum column pressure limit.

2. The method of claim 1, wherein the pressure of the system is measured by means of the pressure monitor for one or more flow rates.

3. The method of claim 2, wherein the chromatographic column is replaced or bypassed with tubings.

4. The method of claim 1, wherein the pressure of the system is calculated for one or more flow rates by subtracting pressure(s) of the system measured by means of the pressure monitor, wherein the chromatographic column is disconnected from the system, from pressure(s) of the system measured by means of the pressure monitor.

5. The method of claim 1, wherein the pressure of the system is calculated for one or more flow rates without the chromatographic column using the Bernoulli equation:

$$\Delta P=(128*L*Q*\eta)/(\pi*d4)$$

wherein, d is an inner diameter of the fluid flow path (mm), Q is the flow rate (ml/min), L is a length (mm) of the flow path and η is the viscosity (cP) of the liquid medium.

6. The method of claim 1, wherein the pressure of the system is measured or calculated without the chromatographic column for at least two different flow rates.

7. The method of claim 1, wherein if the determined contribution of the system pressure drop to the summed pressure exceeds 5%, 10%, 15% or 20%, an operating flow rate for the chromatographic column is determined to a flow rate that corresponds to a pressure at the system pump which is lower than the predetermined maximum column pressure limit.

8. The method of any claim 1, further comprising:
calculating/measuring a delta-pressure signal for the chromatographic column in the system by measuring a pressure by means of the pressure monitor at the predetermined recommended flow rate and subtracting therefrom a measured or calculated pressure of the system without the chromatographic column at the predetermined recommended flow rate.

9. A high performance liquid chromatographic system comprising: a) a liquid reservoir for a liquid medium, a chromatographic column in fluid communication with the liquid reservoir, said chromatographic column having a predetermined recommended flow rate and a predetermined maximal column pressure limit, at least one system pump arrangeable to force liquid from the liquid reservoir through the chromatographic column at a certain flow rate, a fluid flow path connecting the liquid reservoir, the system pump and the chromatographic column, and a pressure monitor arranged before said chromatographic column, and b) a system controller for determining an operating flow rate for the chromatographic column of the system, wherein the system controller is arranged to perform steps of claim 1.

10. A computer program comprising program code means stored on a non-transitory computer readable medium for performing the method of claim 1, when the program is run on a computer.

11. A computer program product comprising program code means stored on a non-transitory computer readable medium for performing the method of claim 1, when the program is run on a computer.

12. The method of claim 1, wherein the pressure of the system is measured or calculated without the chromatographic column for at least three different flow rates.

* * * * *